United States Patent [19]

Miksch et al.

[11] Patent Number: 4,580,942

[45] Date of Patent: Apr. 8, 1986

[54] DEVICE FOR THE MANIPULATION OF WORKPIECES, ASSEMBLY PARTS, OR THE LIKE

[75] Inventors: Heribert Miksch, Göppingen; Martin Storz, Geislingen, both of Fed. Rep. of Germany

[73] Assignee: MICO-Gesellschaft fur Industrielle, Goeppingen, Fed. Rep. of Germany

[21] Appl. No.: 575,321

[22] Filed: Jan. 31, 1984

[30] Foreign Application Priority Data

Feb. 5, 1983 [DE] Fed. Rep. of Germany ....... 3303908

[51] Int. Cl.⁴ .......................................... F16H 21/02
[52] U.S. Cl. ........................................ 414/749; 74/27; 901/14
[58] Field of Search .................. 414/749, 751; 901/14; 74/27

[56] References Cited

U.S. PATENT DOCUMENTS

| 3,525,268 | 8/1970 | Kenny | 74/84 |
| 3,703,834 | 11/1972 | Beezer | 414/749 X |
| 3,881,362 | 5/1975 | Beezer | 414/749 X |
| 4,002,245 | 1/1977 | Mink | 901/16 X |

Primary Examiner—William E. Wayner

[57] ABSTRACT

A device for the manipulation of workpieces or the like has a stepping transmission with a click-stop setting and located in a gearbox and it regulates two reciprocal motions of the workpiece holding mechanism through cam plates fastened to a drive shaft. A first motion is that of a carriage sliding on the gearbox housing and a second motion is that of a holder guided on the carriage for movement essentially perpendicular to the first motion. Two pair of complementary cam plates is provided on the drive shaft for each motion for the purpose of greater precision of the reproducibility of the prescribed motions. The first pair of complementary cam plates is coupled to the carriage through a first control shaft and a crank assembly consisting of a crank and a coupling, while the second pair of complementary cam plates operates in combination with the holder through a second control shaft. The crank and the coupling in the click-stop setting of the stepping transmission are in a dead center position.

17 Claims, 4 Drawing Figures

DEVICE FOR THE MANIPULATION OF WORKPIECES, ASSEMBLY PARTS, OR THE LIKE

BACKGROUND OF THE INVENTION

This invention concerns a device for the support and movement of workpieces, assembly parts, or the like, by a stepping transmission having a click-stop setting are located in a gearbox, which controls two reciprocal motions of the workpiece through cam plates fastened to a drive shaft. Included as a first motion is that of a carriage sliding on the gearbox housing, and, as a second motion, that of a holder guided on the carriage essentially perpendicularly to the first motion.

Such devices are used for the automatic removal, replacement, and transporting of assembly parts, for loading workpieces into machine tools, and for like operations. For this purpose, an appropriate tool to grip the workpiece or the assembly part is fastened to the holder. The cycle of motion of the holder with the tool in this case generally consists of, lifting, forward motion, lowering, and subsequent retraction of the holder. Depending on the arrangement of the cam plates on the drive shaft, this retraction can be brought about immediately or after a lowering of the holder. Optionally another lifting may follow the setting down of the workpiece or assembly part; in this case, another lowering follows the retraction in order to return to the click-stop position.

In a known device of this design (shown in Mink U.S. Pat. No. 4,002,245), a cam plate is provided on the drive shaft for the control of the carriage, and another cam plate is provided for the control of the holder. The operation occurs in each case through a lever, whose shorter lever arm is held in position at the circumference of the associated cam plate by means of spring force at its free end which has a roller, and whose longer lever arm brings about the reciprocal motion through a rocker arm guide. An unfavorable transmission results from this. In addition, a tightening of the available manufacturing tolerances, from which will follow increasing inaccuracy with increasing wear between the cam plate and the roller of the lever, since this inaccuracy of the holder motion is not only amplified with increasing wear, but furthermore becomes larger from the outset as a result of the unfavorable lever transmission. The consistency of the center position and the reproducibility of millimeter-precision motions therefore leaves something to be desired. Furthermore, because of the spring action which is intended to hold the shorter lever with its roller in position on the cam plate, the cadence or the number of operating cycles per unit time cannot be arbitrarily high, since a transient lifting of the roller from the circumference of the cam plate can occur because of the accelerations appearing, in spite of the opposition of the spring, which can lead to jerky motions during the stroke and also to inaccuracies. Finally, this known stepping transmission is a so-called swing transmission with a maximum swing angle of only 45°, which makes possible undesirable elastic deformations in tension or compression in the end positions, which also bring about inaccuracies.

The use of complementary cam plates for stepping transmissions is known from German Patent No. 2,903,732. It is also understood that crank-coupling transmissions are known in themselves.

The problem which the invention addresses is considered to be the provision of a device of the type described initially which provides a high cadence and more precise reproducibility of the desired motion cycles at the same time, while avoiding the drawbacks mentioned.

SUMMARY OF THE INVENTION

It has now been found that this problem may be solved by providing two complementary cam plates for the control of a first motion, and a second pair for the control of the second motion. The first complementary pair of cam plates is coupled to the carriage through a first control shaft and a crank mechanism consisting of a crank and coupling, with the crank and the coupling being in a dead center position in the click-stop position of the stepping transmission. The second complementary pair of cam plates operates in combination with the holder through a second control shaft.

Use of complementary pairs of cam plates ensures that there is constant contact between the cam plates and the associated control elements of the particular control shafts, so that any spring action with its described drawback for maintaining contact can be dispensed with. Even this results in greater accuracy of the operating cycle, and furthermore to its more rapid reproducibility, which ultimately increases the effectiveness and the economy of the device. Finally, the use of a crank mechanism consisting of a crank and coupling between the first control shaft and the carriage in a dead center position in the click-stop position of the stepping transmission provides that any tolerances present or even a clearance caused from wear has practically no effect. The motion of the crank in one of the two so-called dead center positions produces no motion at all of the carriage to a first approximation, since a displacement of the crank or of the coupling in the region of the dead center position caused by tolerances or slight wear can occur only perpendicularly to the direction of motion of the carriage, inasmuch as the tangent to the circular path of motion of the free end of the crank in this region now stands perpendicularly to the direction of motion. This guarantees that even after a long time or after a very large number of operating cycles, the accuracy of the positioning of the carriage does not suffer in its two end positions. Furthermore, the crank and the coupling in the retracted end position of the carriage are appropriately located in their mutually lengthened or stretched position, in which the same conditions prevail as in the final advanced position, i.e., a relatively slight displacement of the crank mechanism from the absolute center position, undesirable in itself, caused by tolerance or wear clearance, still produces no inaccuracy of the final advanced position of the carriage. It is to be understood that elastic bending deformations, which produce elastic inaccuracies, cannot occur in the 180° dead center position of the crank and the coupling.

In accordance with a preferred embodiment, the first complementary pair of cam plates has two tooth sectors displaced from one another in a circumferential direction for engagement in two roller rings located on the first control shaft. On the one hand, this has the advantage of an interlocked transfer of power and motion, and on the other hand provides the capability during the shutdown times of the first control shaft, of interlocking it by positioning the circular sections of the cam plates on two rollers of the roller ring adjacent to one another. The second control shaft is beneficially equipped with a double rocker arm as a swing shaft, and its ends are placed to rest on the second complementary pair of cam plates. It is to be understood that the one end of the rocker arm in this case rests on the circumference of the one cam plate, preferably through a roller, while the other end of the rocker arm rests in the same way on the circumference of the first-mentioned complementary cam plate in such a way that there is an axial displacement of the two ends of the rocker arm with respect to one another. This corresponds to the axial separation of the two pairs of complementary cam plates resting on the drive shaft. It is to be understood that such an axial displacement or adjacent placement applies also to the roller ring located on the first control shaft, whose axial distance again corresponds to the axial separation of the cam plates of the first pair of complementary cam plates on the drive shaft.

The second drive shaft operates in combination with the holder through a rocking lever provided at its free end. This extends through a recess in the carriage permitting relative motion between the rocking lever and the carriage. The free end of the rocking lever engages with a sleeve bearing in which it can rotate, and which can move back and forth on a supporting bar rigidly connected to the holder.

The drive shaft can be driven directly in a transmission ratio of 1:1. However, there is desirably a worm gear on the drive shaft so that the drive can occur through a separate motor shaft with worm gear through which the transmission ratio can be matched within broad limits to the desired motor and the cadence of the device. An electric motor with an eddy-current brake, which operates with especially low noise, is preferred as the drive motor. A switch cam for any switching processes can also be placed on the drive shaft, for example for turning off the device after completion of the operating cycle.

In a preferred embodiment, the design is such that two revolutions of the drive shaft correspond to one operating cycle from click-stop position to click-stop position.

The holder is preferably a plate moving in its own plane, and it has a rectangular shape and threaded holes in it to fasten tools both on its face away from the carriage and on its front face. The distances between these holes are chosen appropriately so that when tools are suitably positioned, the action of the longitudinal stroke can be doubled by an intermediate release of the transported workpiece or assembly part.

DETAILED DESCRIPTION OF THE ILLUSTRATED EMBODIMENT

Figure 1:
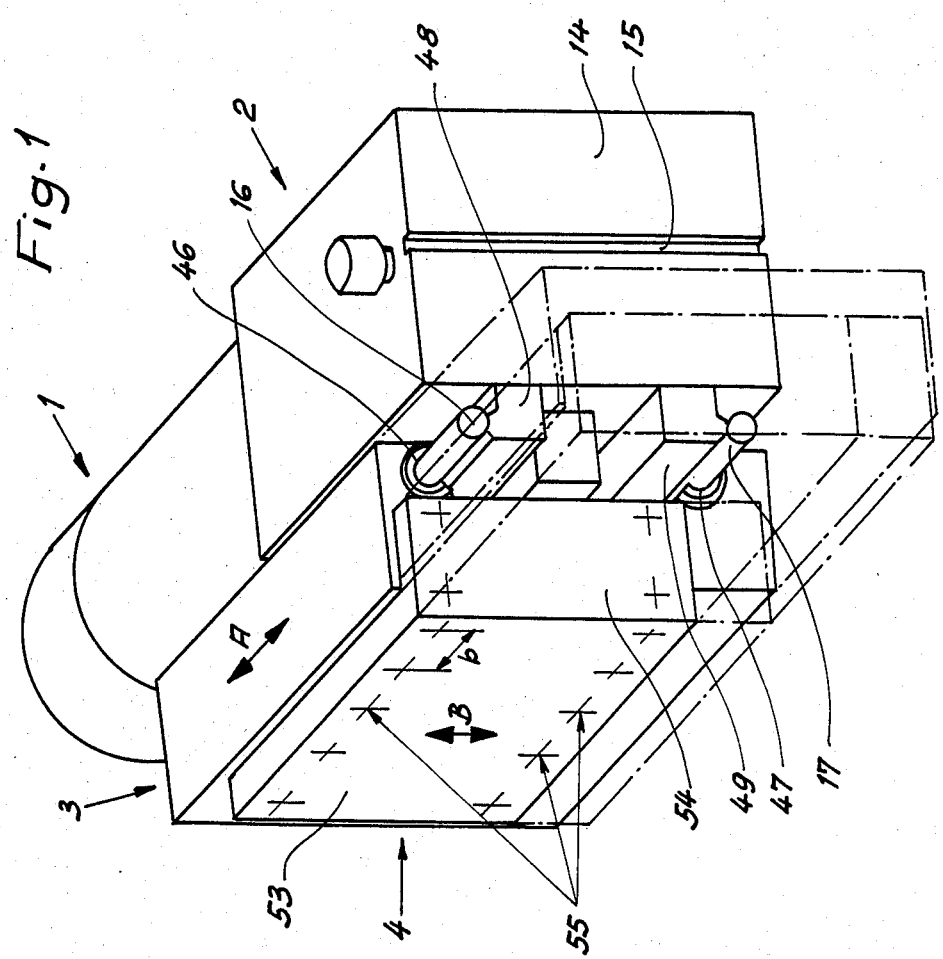
FIG. 1 is a graphic view of a horizontally positioned device, diagonally from the front and above.

The illustrated embodiment has a motor 1, a gearbox 2, a carriage 3 and a holder 4. In the gearbox 2 there is a stepping transmission which has a drive shaft 5 with cam plates 6, 7, 8 and 9, which control as a first reciprocal motion, that of the carriage 3 guided on the gearbox 2 in the directions of the double arrow A, and as a second reciprocal motion, that of the holder 4 guided essentially perpendicular to the first motion in the directions of the double arrow B. In accordance with the invention, there are two complementary cam plates 6, 7, 8 and 9 for the control of the first motion and also for the control of the second motion. The first complementary pair of cam plates 6, 7 is coupled to the carriage 3 through a first control shaft 10 and a crank mechanism consisting of crank 11 and coupling 12. The crank 11 and coupling 12 are in a dead center position in the click-stop position of the stepping transmission. The second complementary pair of cam plates 8, 9 operates in combination with the holder 4 through a second control shaft 13.

In the embodiment shown, the crank 11 and the coupling 12 are positioned in their mutually lengthening stretched position in the retracted final position of the carriage 3 corresponding to the click-stop condition of the device. As FIGS. 2 and 4 also show particularly clearly, the carriage 3 is guided essentially horizontally on the gearbox 2 and the holder 4 essentially vertically on the carriage 3. However, it is to be understood that the device can be positioned arbitrarily in space, for example it can also be rotated by 90° into the vertical position. The gearbox 2 is preferably designed so that it can be bolted to the machine frame, not shown, on its completely free side. The front face 14 of the gearbox 2 (FIGS. 1 and 2) is also designed so that additional equipment, such as presses or the like can be connected by flange; the supplementary equipment can be fastened by a fitted spline located there.

As a guide for the carriage 3, two horizontal slide bars 16, 17 are provided on the gearbox 2, on which the carriage 3 can slide back and forth in the direction of the double arrow A. Again, two vertical slide bars 18, 19 (FIGS. 2 and 4) are rigidly fastened in a manner not shown to the carriage 3, which are held in bearings 44', 45' provided on the holder 4.

Figure 2:
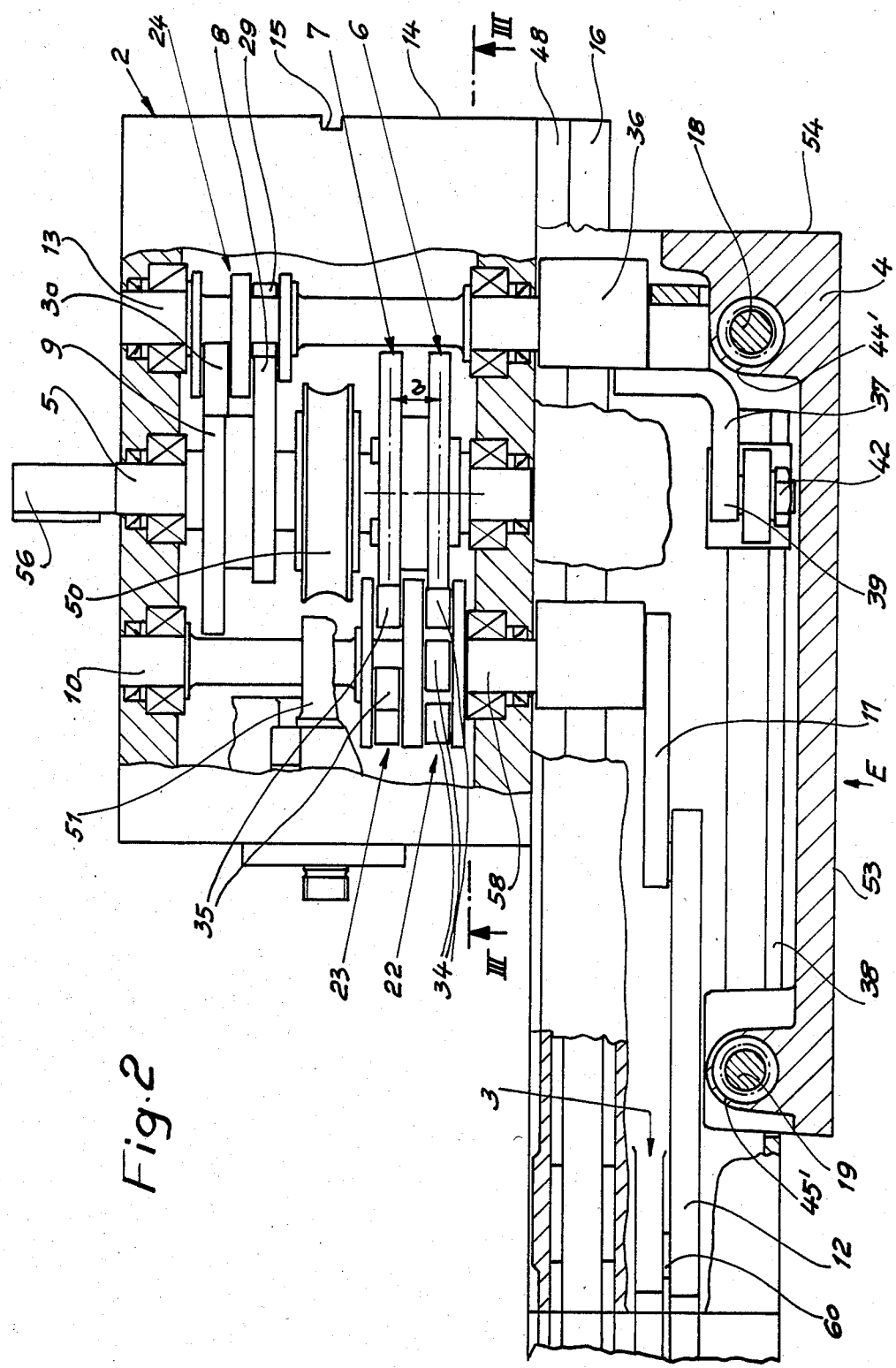
FIG. 2 is a top view of the device of FIG. 1, in partial section.
Figure 3:
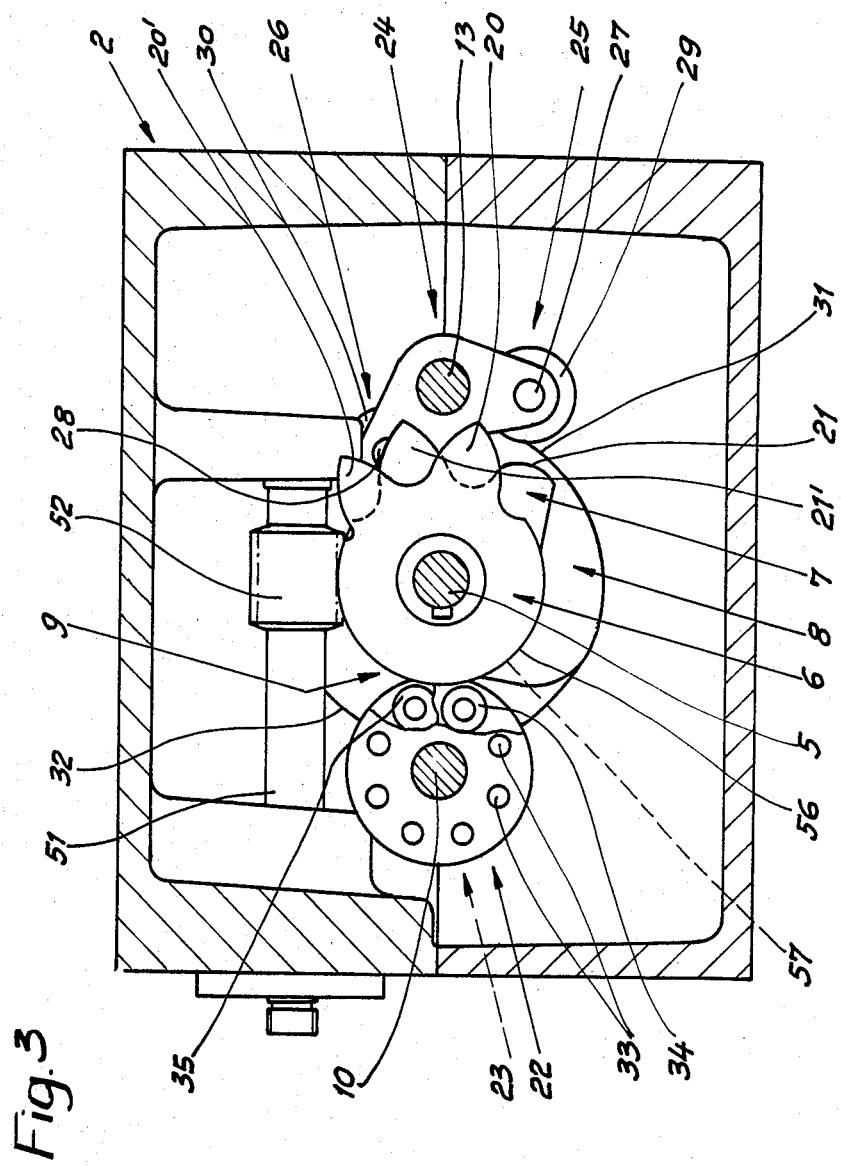
FIG. 3 is a section along line III—III in FIG. 2.

As FIGS. 2 and 3 show the first pair of complementary cam plates 6, 7 has two tooth sectors displaced circumferentially from one another, each of which consists of two teeth, 20, 20' and 21, 21' in the embodiment shown. These tooth sectors are intended to engage in two roller rings 22, 23 placed on the first control shaft 10. Both the cam plates 6, 7 of the pair of complementary cam plates and also the two roller rings 22, 23 are positioned in each case on the drive shaft 5 or the first control shaft 10, respectively, at a distance a corresponding to one another in the axial direction (FIG. 2).

The second control shaft 13 is equipped with a double rocker arm 24 as a swing shaft, whose ends 25, 26 are positioned so that they can come to rest on the second pair of complementary cam plates 8, 9. These ends 25, 26 in the preferred embodiment shown are provided with rollers 29, 30 resting on axle pins 27, 28 in order to produce a rolling friction on the circumferences 31, 32 of the cam plates 8, 9 instead of sliding friction. For this reason, the axle pins 33 of the roller rings 22, 23 are also equipped with rollers 34, 35.

The second control shaft 13 operates in combination with the holder 4 through a rocking lever 37 provided on its free end 36, through a recess 38 in the carriage 3. This recess 38 permits a relative motion between the rocking lever 37 and the carriage 3, so that the carriage 3 can move back and forth in the direction of the double arrow A relative to the gearbox 2, and thus to the second control shaft 13. The free end 39 of the rocking lever engages in a friction bearing 40 in which it can rotate, which can move back and forth on a support bar 41 rigidly connected to the holder 4. In the embodiment shown, the free end 39 of the rocking lever 37 is connected to a side bar 43 provided on the friction bearing 40.

The carriage 3, the holder 4, and the free end 39 of the rocking lever 37, are guided on the associated slide bars and support bars by means of linear ball bearing. In the case of the support rod 41, the linear ball bearing 40' is provided for the free end 39 of the lever 37, while the holder 4 has linear ball bearings 44, 45. In accordance with FIG. 1, slotted linear ball bearings are provided for the carriage 3, of which only the front linear ball bearings 46, 47 are visible. These slots are necessary to make it possible to guide the carriage 3 on the slide bars 16, 17 since these are fastened to brackets 48, 49 mounted on the gearbox 2.

A worm gear 50 is placed on the draft shaft 5 (FIG. 2), driven by the electric motor 1 designed as an eddy-current brake motor, through a separate motor shaft 51 with worm 52. The eddy-current brake motor 1 has been omitted in FIGS. 2 through 4 for clarity. The final end of the stepping transmission consisting of the drive shaft 5, the pairs of complementary cam plates 6, 7, 8 and 9, the roller rings 22, 23, the rocking lever 24, and the two control shafts 10 and 13, is appropriately designed so that two revolutions of the drive shaft 5 correspond to one operating cycle from click-stop position to click-stop position. In the click-stop position, for example, the carriage 3 can be in the fully retracted position shown in FIGS. 1, 2 and 4 and the holder 4 can be completely raised or completely lowered, depending on the design. FIG. 1 shows the holder 4 in the fully raised position.

The holder 4 is preferably a plate moving in its own plane, which has an angular shape, and has a threaded holes 55 to fasten tools, not shown, such as gripping devices, both on its face 53 away from the carriage 3 and on its angled front face 54, which are merely indicated in FIG. 1. The separations b of the holes 55 are chosen so that when tools are placed appropriately, the effect of the longitudinal stroke (double arrow A) can be doubled by an intermediate lowering of the transported workpiece or assembly part.

The embodiment of the invention described operates as follows. The drive shaft 5 can be driven either directly through its drive end 56 or geared down through the worm drive 50, 51. Each complete revolution of the drive shaft 5 produces a rotation of the first control shaft 10 by 180° through the complementary pair of cam plates 6, 7 by the engagement of their tooth sectors 20, 20' and 21, 21' in the roller rings 22, 23. In the region of rotation of the drive shaft 5 between the engagement and the disengagement of the tooth sectors 20, 20' and 21, 21' in the roller rings and out of the roller rings 22, 23, the latter and with it the first control shaft 10 are interlocked because of the fact that a roller 34 and a roller 35 rest against and roll on the corresponding circular control curves 56 and 57 of the complementary pair of cam plates 6, 7 (FIG. 3). This interlocked position of the first control shaft 10 corresponds in each case to a click-stop condition of the stepping transmission and particularly of the carriage 3, in which the crank mechanism consisting of the crank 11 and the coupling 12 is in the extended position. In the retracted position of the carriage 3 shown, the position of the crank rotated by 180°, not shown, the crank is practically covered over by the coupling 12 in the view of FIG. 4, with the carriage 3 being in its second extreme position, namely in its farthest advanced position. Between the described extreme positions of the carriage 3, the crank 11 rotates in the direction of the arrow C (FIG. 4), since it is rigidly attached to the free end 58 of the first control shaft by means of interlock and positive force, and carries along the crank 12 through a pivot pin 59, which in turn is linked to the carriage 3 through a pivot pin 60.

Figure 4:
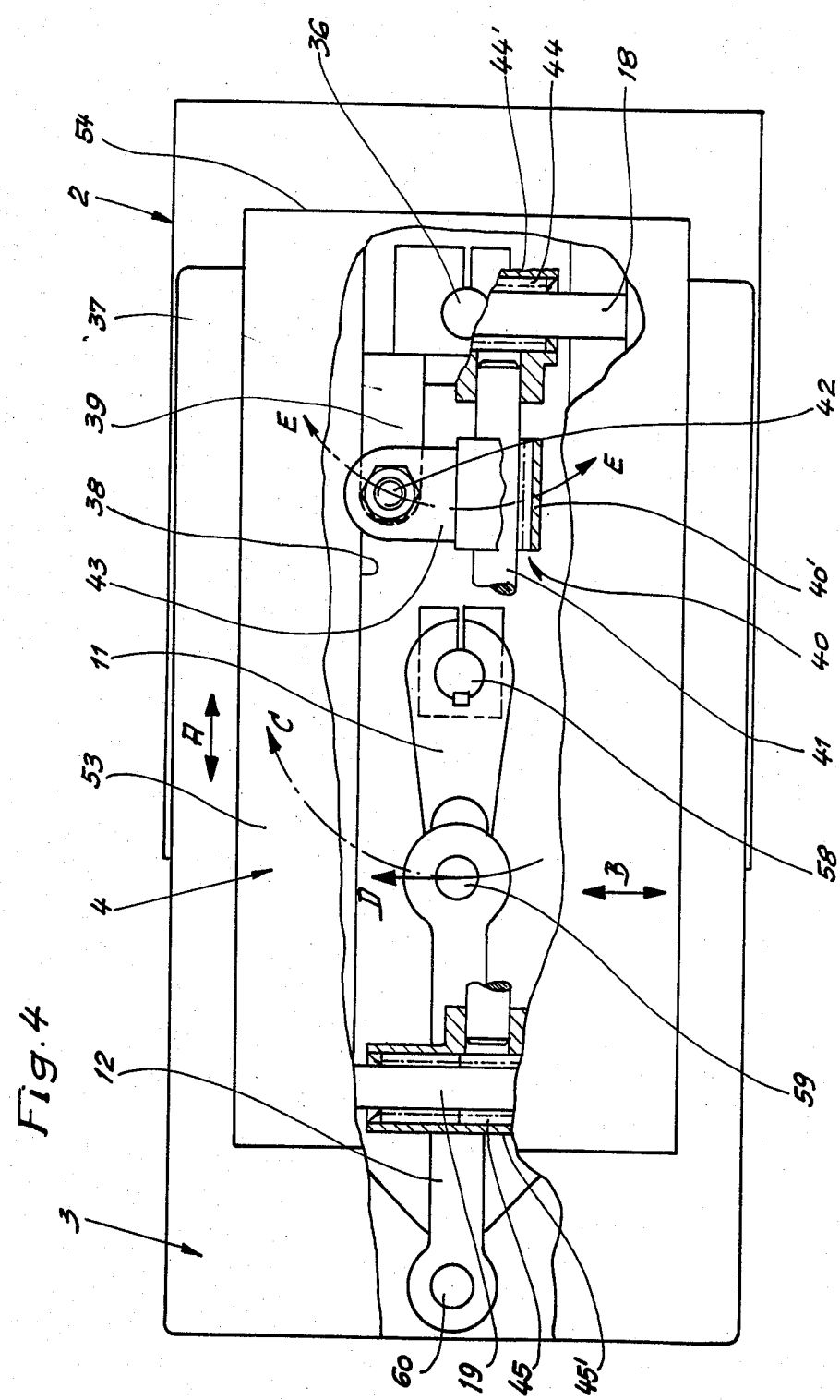
FIG. 4 is a side view in the direction of the arrow E in FIG. 2, in partial section.

It is immediately apparent that in the extended position of the crank 11 and coupling 12 seen in FIG. 4, a deviation of the crank 11 in the direction of the arrow C (or opposite to this) as a result of clearance caused by tolerances or by wear can produce practically no displacement of the carriage 3 in the direction of the double arrow A, since the deviation of the crank 11 to a first approximation is practically perpendicular to the direction of motion according to the double arrow A, namely in the direction of arrow D in FIG. 4.

Since the second pair of complementary cam plates 8, 9 is also in a corresponding circumferential displacement on the drive shaft 5, there is a forced back and forth motion of the rocking lever 24 with a corresponding up and down pivoting of the free end 39 of the rocker lever 37 in the direction of the double arrow E. Thus, the holder 4 can be raised or lowered in the particular end positions of the carriage 3, or the reverse, depending on which sequences of motions are desired. The bell crank 37 in this case acts on the holder through the support rod 41 in the direction of lifting or lowering the holder in the direction of the double arrow B, so that because of the sliding connection by means of the friction bearing 40, the relative motion of the holder 4 with respect to the carriage 3 according to the double arrow B is independent of the motion of the carriage 3 in the direction of the double arrow A relative to the gearbox 2. This is made possible not only by the illustrated connection between the rocker lever 37, the friction bearing 40, and the support bar 41, but also by the hole or recess 38 provided in the carriage 3, whose shape and size depends on the one hand on the length of the back and forth motion of the carriage 3 relative to the gearbox 2 and on the other hand on the height of the motion of the holder 4 relative to the carriage 3, as well as on the sequence of motions and any intersections of these motions.

The range of motion of the carriage 3 on the one hand and the holder 4 on the other hand is seen from FIG. 1, where each of these ranges is indicated with broken lines.

Having thus described the invention, we claim:

1. In a device for the support and movement of workpieces along two mutually perpendicular axes, the combination comprising:
  (a) a housing providing a gearbox;
  (b) a stepping transmission in said gearbox for controlling reciprocal motions along two mutually perpendicular axes;
  (c) drive means for said transmission;
  (d) a carriage movably mounted on said housing for reciprocal movement along a first axis;
  (e) a holder movably mounted on said carriage for reciprocal movement along a second axis perpendicular to said first axis, said holder having means for supporting a workpiece;
  (f) a carriage drive mechanism in said housing and in part comprising said transmission, said mechanism including a first pair of complementary cam plates rotatable by said drive means, a first control shaft rotatably supported in said housing for rotation in response to movement of said cam plates, and a crank mechanism comprising a crank connected to said control shaft and a coupling engaged with said carriage to effect movement of said carriage upon rotation of said control shaft; and (g) a holder drive mechanism in said housing and in part comprising said transmission, said mechanism including a second pair of complementary cam plates rotatably by said drive means and a second control shaft rotatably supported in said housing for rotation in response to movement of said cam plates, said holder being coupled to said holder drive mechanisms to effect reciprocal movement of said holder upon rotation of said second control shaft, said stepping transmission having a stop position wherein said crank and coupling of said carriage drive mechanism are in one extreme position of movement when the stepping transmission is in a dead center position.

2. The workpiece support and movement device of claim 1 wherein said crank and said coupling are in their mutually extended position in a position of said carriage at one end of its reciprocal movement corresponding to the click-stop position of said transmission.

3. The workpiece support and movement device of either of claim 1 or claim 2 wherein said carriage is guided in essentially horizontal movement of said gearbox and said holder is guided in essentially vertical movement on said carriage.

4. The workpiece support and movement device of claim 1 wherein there are included slide rods as guides, two horizontal slide rods for said carriage being rigidly attached to said gearbox housing, and two vertical guide rods for said holder being rigidly attached to said carriage.

5. The workpiece support and movement device of claim 1 wherein said pair of complementary cam plates of said carriage drive mechanism has two tooth sectors displaced circumferentially with respect to one another for engagement in two roller rings located on said first control shaft.

6. The workpiece support and movement device of claim 1 wherein said second control shaft is configured as a swing shaft with a double rocker lever whose ends are positioned to rest on the pair of complementary cam plates of said holder drive mechanism.

7. The workpiece support and movement device of claim 6 wherein said second control shaft operates in combination with said holder through a rocking lever having its free end extending through a recess in said carriage which permits relative motion between said rocking lever and said carriage.

8. The workpiece support and movement device of claim 7 wherein said free end of said rocking lever engages in a friction bearing in which it can rotate, and which can move back and forth on a support bar rigidly connected to said holder.

9. The workpiece support and movement device of claim 8 wherein said free end of said rocking lever is connected to a side strap provided on said friction bearing by means of an axle pin.

10. The workpiece support and movement device of either of claim 4 or claim 8 wherein said carriage, said holder, and said free end of said rocking lever are guided on the associated slide bars by means of linear roller bearings.

11. The workpiece support and movement device of claim 10 wherein said linear roller bearings are slotted for said slide bars of said carriage.

12. The workpiece support and movement device of claim 11 wherein a worm gear is placed on said drive shaft and is driven through a separate motor shaft with a worm gear.

13. The workpiece support and movement device of claim 1 wherein said drive motor is an eddy-current brake motor.

14. The workpiece support and movement device of claim 1 wherein two revolutions of said drive shaft correspond to one operating cycle from click-stop position to click-stop position of said transmission.

15. The workpiece support and movement device of claim 1 wherein said holder is a plate moving inits own plane.

16. The workpiece support and movement device of claim 15 wherein said plate has a rectangular shape and has threaded holes therein for fastening tools both on its face away from said carriage and on its front face.

17. The workpiece support and movement device of claim 16 wherein the spacing between said holes is dimensioned so that with associated tools appropriately positioned therein, the action of the longitudinal stroke can be doubled by an intermediate release of a transported workpiece.

* * * * *

UNITED STATES PATENT AND TRADEMARK OFFICE
CERTIFICATE OF CORRECTION

PATENT NO. : 4,580,942

DATED : April 8, 1986

INVENTOR(S) : Heribert Miksch and Martin Storz

It is certified that error appears in the above-identified patent and that said Letters Patent is hereby corrected as shown below:

Cover Page, Item [73] Assignee:

The correct name of the Assignee should be as follows:

-- MICO-Gesellschaft fuer industrielle Automation mbH --

Signed and Sealed this

Twenty-first Day of October, 1986

[SEAL]

Attest:

DONALD J. QUIGG

Attesting Officer

Commissioner of Patents and Trademarks